(12) United States Patent
Nomoto et al.

(10) Patent No.: US 12,067,816 B2
(45) Date of Patent: Aug. 20, 2024

(54) METHOD AND SYSTEM FOR PROVIDING DRIVING INFORMATION TO NON-DRIVER USER

(71) Applicant: WOVEN BY TOYOTA, INC., Tokyo (JP)

(72) Inventors: Riku Nomoto, Tokyo (JP); Yosuke Nakayama, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 26 days.

(21) Appl. No.: 17/509,367

(22) Filed: Oct. 25, 2021

(65) Prior Publication Data

US 2023/0128339 A1    Apr. 27, 2023

(51) Int. Cl.
*G07C 5/08*  (2006.01)
*H04L 67/12*  (2022.01)

(52) U.S. Cl.
CPC ............ *G07C 5/0816* (2013.01); *G07C 5/08* (2013.01); *H04L 67/12* (2013.01)

(58) Field of Classification Search
CPC ........... G07C 5/00; G07C 5/08; G07C 5/0816
See application file for complete search history.

(56) References Cited

U.S. PATENT DOCUMENTS

| | | | |
|---|---|---|---|
| 10,535,207 B1 | 1/2020 | Goluguri et al. | |
| 2013/0211623 A1 | 8/2013 | Thompson et al. | |
| 2014/0091900 A1* | 4/2014 | Kohlenberg | H04W 12/08 340/5.6 |
| 2017/0039784 A1* | 2/2017 | Gelbart | G07C 5/00 |
| 2018/0059913 A1 | 3/2018 | Penilla et al. | |
| 2018/0268683 A1 | 9/2018 | Oh | |

FOREIGN PATENT DOCUMENTS

| | | |
|---|---|---|
| JP | 2017-512712 A | 5/2017 |
| JP | 2018-74484 A | 5/2018 |
| JP | 2020-184322 A | 11/2020 |
| WO | 2015/143153 A1 | 9/2015 |
| WO | 2023/277032 A1 | 1/2023 |

* cited by examiner

*Primary Examiner* — Benyam Haile
(74) *Attorney, Agent, or Firm* — Sughrue Mion, PLLC (57) ABSTRACT

A method of a server device is provided. The method includes receiving, from a first terminal of a first user, a registration request to register a second user so as to have access to information provided by a vehicle, registering the second user based on the registration request, receiving an information selection request for selecting one or more information items from among the information provided by the vehicle and to which the second user is permitted access based on the registering, and performing control so that the one or more information items is transmitted to the second terminal, based on the received information selection request.

17 Claims, 6 Drawing Sheets

METHOD AND SYSTEM FOR PROVIDING DRIVING INFORMATION TO NON-DRIVER USER

BACKGROUND

1. Field

The disclosure relates to a system and method for providing driving information to non-driver users.

2. Description of Related Art

During a driving state of a vehicle, passenger contributions (e.g., information, guidance, etc.) to the driver or other parties (i.e., other passengers, third parties monitoring the vehicle, etc.) are sometimes preferred and/or required. For example, a non-driver (i.e., passenger) may often act as a navigator or guide a driver to a destination. Further, a non-driver may detect a dangerous situation on the road, such as a sharp turn ahead, and alert other passengers (e.g., students on a school bus).

Related art technologies utilize artificial intelligence (AI) programs, voice guidance programs, visual displays, etc., to communicate information to the driver of the vehicle in lieu of non-driver contributions. For example, related art vehicle technologies use voice guidance to navigate a driver or notify other passengers inside or outside the vehicle of a dangerous situation. However, with the advances in vehicle technology, the number of sensors has increased, producing large amounts of driving information data that cannot all reasonably be conveyed to the driver safely or sufficiently. Further, where the same information is provided to all occupants of a vehicle (including the driver and passengers), a particular occupant may experience difficulty and inconvenience in locating and absorbing only that information relevant to him or her.

SUMMARY

One or more example embodiments provide a system and method for proving driving information to non-driver users.

According to an aspect of the disclosure, a method of a server device may include receiving, from a first terminal of a first user, a registration request to register a second user so as to have access to information provided by a vehicle, registering the second user based on the registration request, receiving an information selection request for selecting one or more information items from among the information provided by the vehicle and to which the second user is permitted access based on the registering, and performing control so that the one or more information items is transmitted to the second terminal, based on the received information selection request.

According to an aspect of the disclosure, a server device may include a memory storing instructions and a processor configured to execute the instructions to receive, from a first terminal of a first user, a registration request to register a second user so as to have access to information provided by a vehicle, register the second user based on the registration request, receive an information selection request for selecting one or more information items from among the information provided by the vehicle and to which the second user is permitted access based on the registering, and perform control so that the one or more information items is transmitted to the second terminal, based on the received information selection request.

According to an aspect of the disclosure, a non-transitory computer-readable medium may store instructions, the instructions comprising: one or more instructions that, when executed by one or more processors of a device, cause the one or more processors to receive, from a first terminal of a first user, a registration request to register a second user so as to have access to information provided by a vehicle, register the second user based on the registration request, receive an information selection request for selecting one or more information items from among the information provided by the vehicle and to which the second user is permitted access based on the registering, and perform control so that the one or more information items is transmitted to the second terminal, based on the received information selection request.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
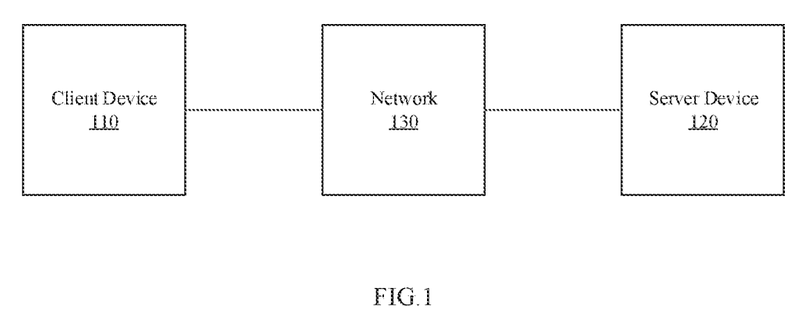
FIG. 1 is a diagram of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a portable multimedia player, a display device (e.g., television), a camera device, a wearable device (e.g., a pair of smart glasses or a smart watch), or a similar device. The user device 110 may be a mobile device with a display, a speaker, and/or a smart key function.

The server device 120 may include one or more processing systems or computing devices that can communicate with other devices via a network.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
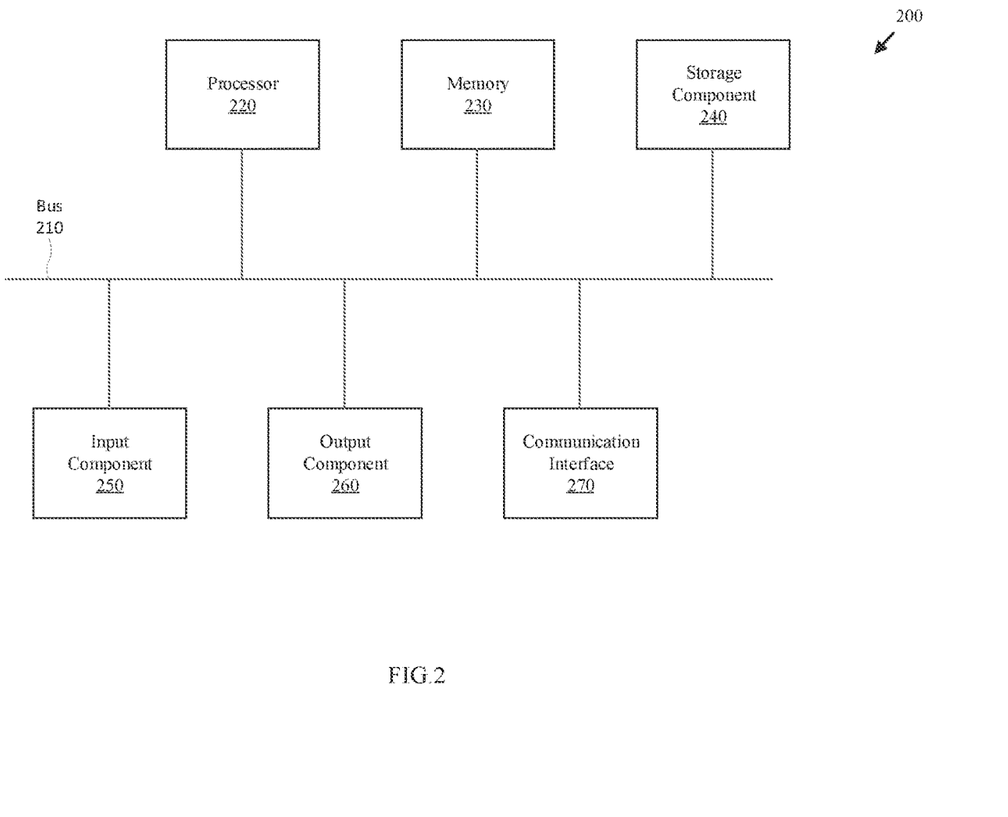
FIG. 2 is a diagram of components of one or more devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Figure 3:
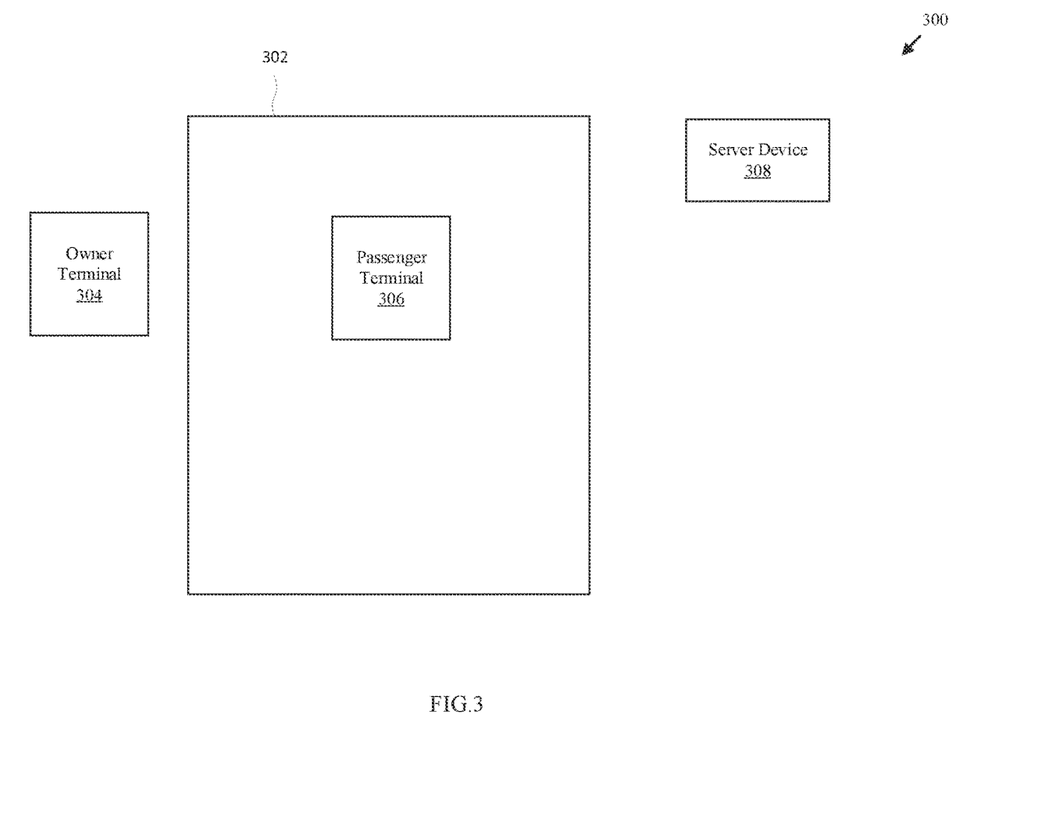
FIG. 3 is a diagram of a system for providing driving information to non-driver users according to an embodiment.

FIG. 3 is a diagram of a system for providing driving information to non-driver users according to an embodiment. The system 300 may include a vehicle 302, an owner terminal 304, a passenger terminal 306 and a server device 308 in connection with the vehicle 302, the owner terminal 304 and the passenger terminal 306. The owner terminal 304 and passenger terminal 306 may be inside or outside the vehicle 302. The system may include multiple vehicles, multiple owner terminals, multiple passenger terminals, and multiple server devices, although one of each is depicted for ease of description.

The owner terminal 304 is a terminal of an owner of the vehicle 302. The owner terminal 304 may correspond to the client device 110 of FIG. 1. For example, the owner and/or the owner terminal 304 may be registered (e.g., pre-registered) in association with the vehicle 302 at a time of vehicle purchase, vehicle rental, vehicle lease, etc., or thereafter. By way of example, the owner (or pre-authorized user) of the vehicle 302 may register a unique identifier (such as an email address or username) with a server device (e.g., the server device 120 or 308), in connection with the vehicle 302. The registration (e.g., owner registration) may be performed via an application or a website of a manufacturer of the vehicle 302, a service provider, a rights manager, an application developer, etc. The server device may store the unique identifier of the user in association with the vehicle 302 (e.g., in association with a unique identifier of the vehicle). Thereafter, the owner of the vehicle 302 may utilize the owner terminal 304 to log-in or access vehicle settings via the application or the website. For example, the owner may input his/her unique identifier and a password into the owner terminal 304, and the server device may authenticate the owner based on the same. If the authentication or log-in is successful, the owner can modify settings (such as permissions and accesses) for other users, other roles, etc., and register other users.

The server device 308 may receive, from the owner via the owner terminal 304, a registration request to register another user (e.g., passenger, non-owner, etc.) and/or a terminal of the other user, i.e., the passenger terminal 306. The registration request may include a unique identifier (e.g., username) and/or a communication address (e.g., e-mail address) of the other user. The registration request may also include a role for the other user, such as "driver," "assistant," "client," etc. The role may be selected by the owner from among a plurality of preset roles and/or may be defined or modified by the owner at the time of registering the other user. The registration request may be submitted via the application or the website accessed by the owner using the owner terminal 304.

Each role may grant rights (e.g., permissions) and accesses (e.g., information access) to a user who is registered with that role. For example, a "driver" role may be set (e.g., preset) to grant permission to open and close (or unlock and lock) doors of the vehicle 302 and drive the vehicle 302 (e.g., using a smart key or authentication key installed or configured in the passenger terminal 306 or another device), while also granting access to driving information, navigation information, and multimedia data via the passenger terminal 306. An "assistant" role may be set to grant permission to open and close (or unlock and lock) doors of the vehicle 302 (e.g., using a smart key or authentication key installed or configured in the passenger terminal 306 or another device), while granting access to driving information, navigation information, and multimedia data via the passenger terminal 306. However, the "assistant" role may not grant permission to drive the vehicle 302. Other roles may have various configurations of rights and accesses that can be granted.

The roles may be stored in a rights management registration table stored on the server device 308. Furthermore, instead of or in addition to one or more preset roles (such as those described above), the owner may manually define one or more roles and select which permissions and accesses to grant in each. The owner may create or modify a role for the other user at the time of registering the other user and/or thereafter. For example, the owner may change the other user's role or modify the granted permissions and/or accesses of the other user's role after registering the other user.

The driving information may include information obtained from or based on various sensors operating in the vehicle 302. The driving information may be obtained via or using at least one of a speedometer, a tachometer, an engine coolant temperature gauge, an odometer, an exterior thermometer, an internal clock, a shift range/gear position sensor, a fuel gage, a warning light detector, a tire pressure gauge, and other indicators/sensors. The driving information may include at least one of a vehicle speed, an engine speed (e.g., rotations per minute), a temperature, a distance traveled, a warning light state, a tire pressure, etc.

As described above, the user (e.g., vehicle owner) of the owner terminal 304 may send a registration request to the server device 308 to grant the other user (e.g., passenger, non-owner, etc.) access to the driving information via the passenger terminal 306. Furthermore, the user of the owner terminal 304 may select which driving information the other user (or the role assigned to the other user) has access to (i.e., the owner may limit the amount or categories of driving information that the other user has access to).

Based on the server device 308 successfully registering the other user (e.g., passenger) in response to the registration request, the server device 308 may transmit a notification of the registration to the owner (e.g., to the owner terminal 304, to a communication address (e.g., e-mail address, messaging address, telephone number) of the owner, or to a website or application accessed by the owner via the owner terminal 304). Further, the server device 308 may transmit a notification of the registration to the other user (e.g., to the passenger terminal 306, to a communication address (e.g., e-mail address, messaging address, telephone number) of the other user, or to a website or application accessed by the other user via the passenger terminal 304). The notification to the other user may notify the other user of the registration setting (i.e., the role and/or the permissions/accesses granted to the other user) assigned by the owner terminal 304. Also, the notification to the other user may notify the other user of the registration and of location information (e.g., URL, application link, etc.) through which the other user can view the registration setting (e.g., via the passenger terminal 306).

The passenger terminal 306 may correspond to the client device 110 of FIG. 1. The passenger terminal 306 may display a list of accessible driving information, through which the other user of the passenger terminal 306 can select which driving information to receive. That is, the passenger terminal 306 may display a list of driving information to which the other user is granted access (e.g., the list of driving information set as accessible for a role that is registered to the passenger by the registration request submitted by the owner). The list may be displayed via a website or application accessed by the other user via the passenger terminal 306. The other user may select which of the driving information to receive by making selections and/or de-selections on the displayed list. For example, the passenger terminal 306 may have access to all driving information, but the user of the passenger terminal 306 may only want to receive speedometer and tachometer information from among the driving information. The passenger terminal 306 may transmit or submit an information selection request (e.g., subscription setting) indicating the selected driving information to the server device 308.

The server device 308 may receive the information selection request from the passenger terminal 306 indicating which information is to be provided to the other user. The server device 308 may then register or store, in association with the other user (or the passenger terminal 306), the selected information to be provided to the other user. The server device 308 may acknowledge receipt of the information selection request to the passenger terminal 306 or otherwise notify or confirm to the other user that the selected information has been received and/or registered.

The other user may connect the passenger terminal 306 to the vehicle 302, for example, through an application installed in the passenger terminal 306. In this case, the other user may control to transmit to the server device 308 a connection request to connect the passenger terminal 306 or the application to the vehicle. The connection request may include authentication information (or may be preceded by an authentication) of the other user. For example, the other user may input a registered unique identifier (e.g., username or communication address) and password via the application, and the passenger terminal 306 may transmit the same to the server device 308 with/as the connection request. Alternatively, the authentication may occur prior to the connection request. The server device 308 may authenticate the other user and control to connect the passenger terminal 306 (or the application) to the vehicle 302 (e.g., a computing device or operating system of the vehicle 302) based on the authentication and/or the connection request. To this end, the server device 308 may transmit to the vehicle 302 at least one of a result of the authentication, a communication address/information of the passenger terminal 308, or a notification of the connection request. The server device 308 or the passenger terminal 306 may also transmit to the vehicle 302 a list of information to be provided to the passenger terminal 306 in accordance with the information selection request or subscription setting described above. The vehicle 302 may receive this information at the time of the information selection or based on the connection.

The vehicle 302 and the passenger terminal 306 may be connected via a peer-to-peer connection (e.g., Bluetooth, WiFi Direct, etc.). Further, the vehicle 302 and the passenger terminal 306 may be connected independently (e.g., via Bluetooth) of the authentication or the connection request, and the connection request may be to connect the application installed in the passenger terminal 308 to the vehicle 302.

Based on the connection established between the passenger terminal 308 (or the application executing therein) and the vehicle 302, the vehicle 308 notifies the other user (via the application executing on the passenger terminal 306) of the selected driving information. For example, the vehicle 302 may push the selected driving information in a constant or a semi-constant stream, on a real-time basis upon obtaining or generating the information, in response to an event (e.g., a change in the information), and/or at preset timing intervals. The timing interval may be preset (e.g., by a manufacturer or developer) or may be set by the other user, e.g., included in the information selection request or via an independent setting. The vehicle 302 may transmit the driving information to the passenger terminal 306 based on a triggering event. For example, if temperature sensed by the engine coolant temperature gauge exceeds a preset threshold, the vehicle 302 may transmit the driving information regarding the engine coolant temperature to the passenger terminal 306 (e.g., by way of a push notification, message, call, etc.).

Figure 4:
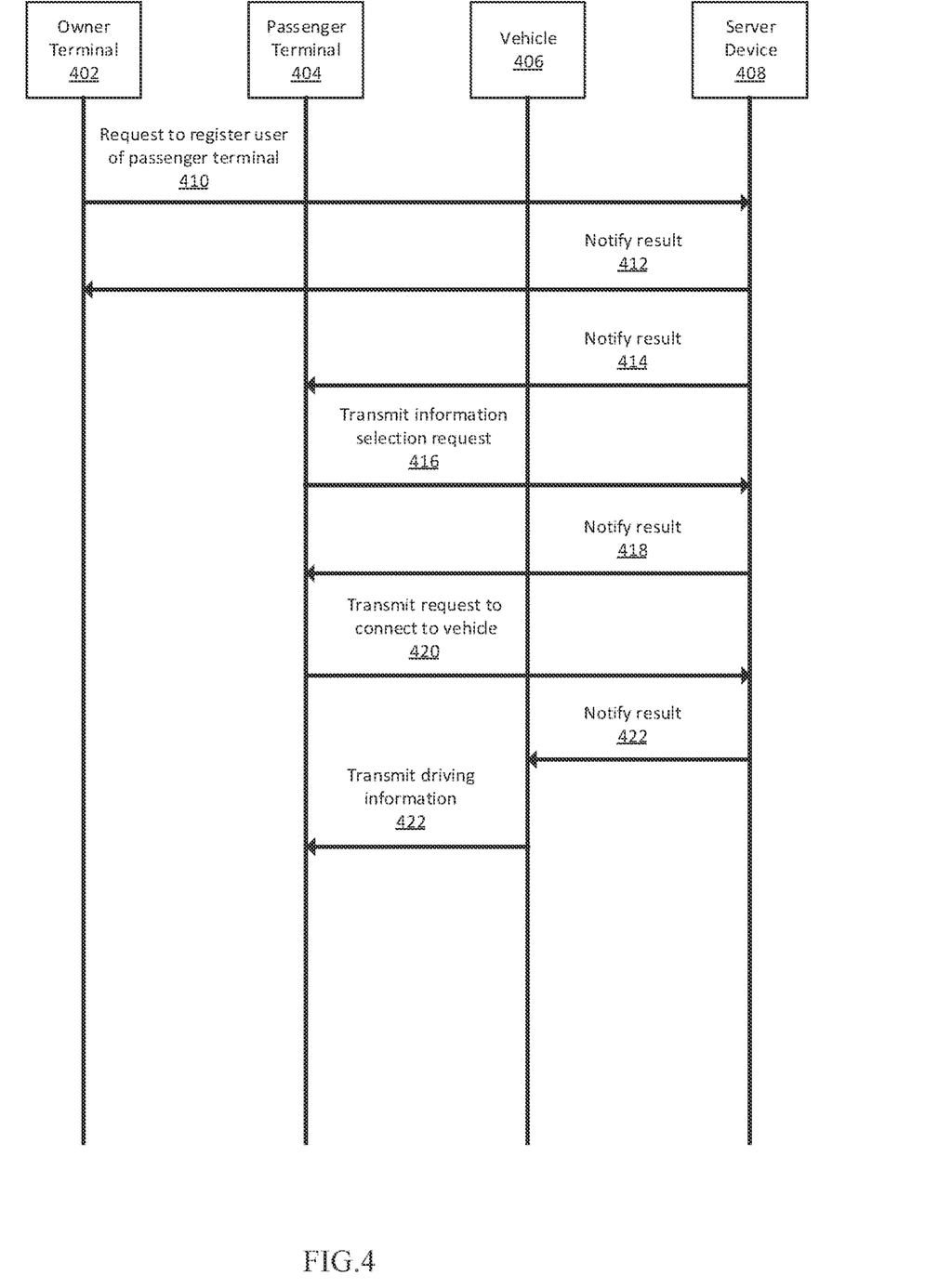
FIG. 4 is a diagram of a process flow of a system for providing driving information to a non-driver user according to an embodiment.

FIG. 4 is a diagram of a process flow of a system for providing driving information to a non-driver user, according to an embodiment. The system may include an owner terminal 402, a passenger terminal 404, a vehicle 406, and a server device 408. The server device 408 may include a rights manager (or rights management registration table) on a cloud server.

Referring to FIG. 4, in operation 410, the owner terminal 402 sends a request to the server device 408 to register another user (or the passenger terminal 404) with a role. Alternatively, the owner terminal 402 may change or assign a new role to a previously-registered other user or device in operation 410.

In operation 412, the server device 408 provides a notification to the owner terminal 402 indicating the result of the registration. In this regard, the registration may be indefinite or may be for a predetermined time period and/or a predetermined location. The time period and/or location may be set by default or may be set by a user (e.g., owner). Further, the time period and/or location may be set on a user-by-user basis and/or a role-by-role basis.

In operation 414, the server device 408 provides a notification to the passenger terminal 404 indicating the result of the registration. In operation 416, the passenger terminal 404 transmits an information selection request to the server device 408. The information selection request may include the driving information the other user of the passenger terminal 404 selects to be transmitted to the passenger terminal 404. In operation 418, the server device 408 transmits a notification to the passenger terminal 404 indicating the result of the information selection request.

In operation 420, the passenger terminal 404 transmits a request to the server device 408 to connect the vehicle 406 to the passenger terminal 404. Alternatively, the server device 408 may connect the passenger terminal 404 with the vehicle in response to receiving the information selection request in operation 416. In operation 422, the server device 408 transmits a notification to the vehicle 406 indicating the result of the connection request (e.g., an authentication result, a notification of the connection request, an instruction to connect to the passenger terminal 404, etc.) of the passenger terminal 404 to the vehicle 406. In operation 424, the vehicle 406 connects to the passenger terminal 404 (or an application executing in the passenger terminal 404) and transmits the selected driving information to the passenger terminal 404. Alternatively, the vehicle 406 may transmit the driving information to the server device 408, and the server device 408 may then transmit the driving information to the passenger terminal 404.

Figure 5:
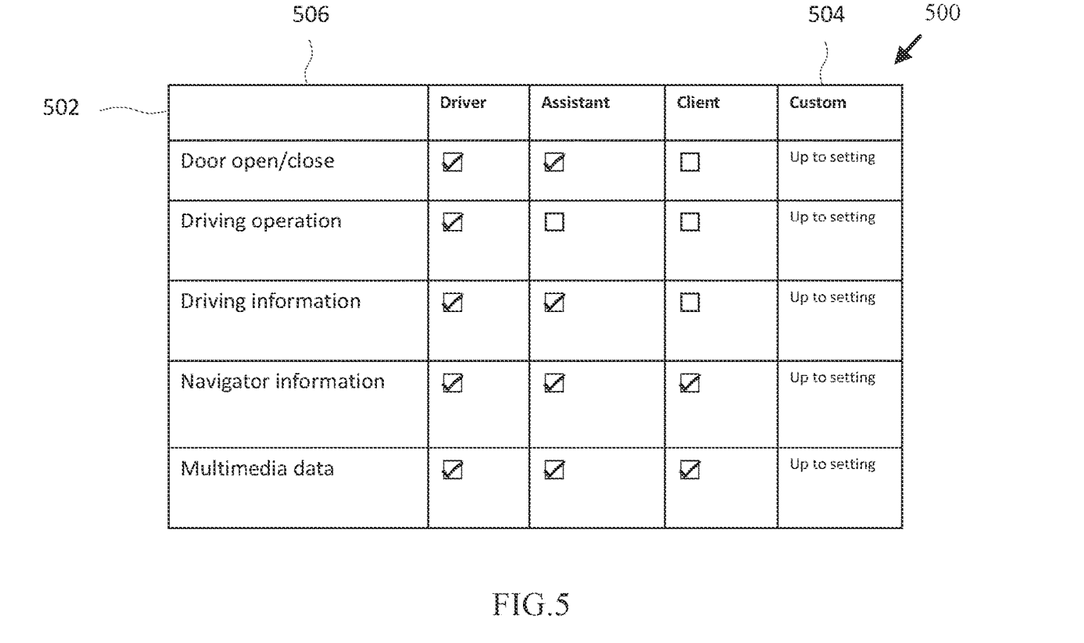
FIG. 5 is a diagram of a rights management registration table according to an embodiment.

FIG. 5 is a diagram of a rights management registration table 500, according to an embodiment. The rights management registration table 500 may be stored on a server device. The rights management registration table 500 may also be displayed on an owner terminal as an interface for assigning rights according to roles and/or for creating, managing, and configuring roles. As shown in FIG. 5, the row 502 indicates the role, such as "driver", "assistant" and "client." The rights management registration table 500 may also provide a custom role option 504. Column 506 shows various permissions for a passenger terminal (or another user) based on the role assigned to the passenger terminal (or the other user). Some permissions may include opening/closing a vehicle door, driving a vehicle, accessing driving information, accessing navigator information, accessing multimedia data, etc.

As shown in the register table 500, in one example, the driver role may include all permissions, the assistant role may include all permissions except for driving operation, the client role may include the navigation information and multimedia data permissions, and various custom roles may be set up by the owner terminal to define custom roles with various permissions.

Figure 6:
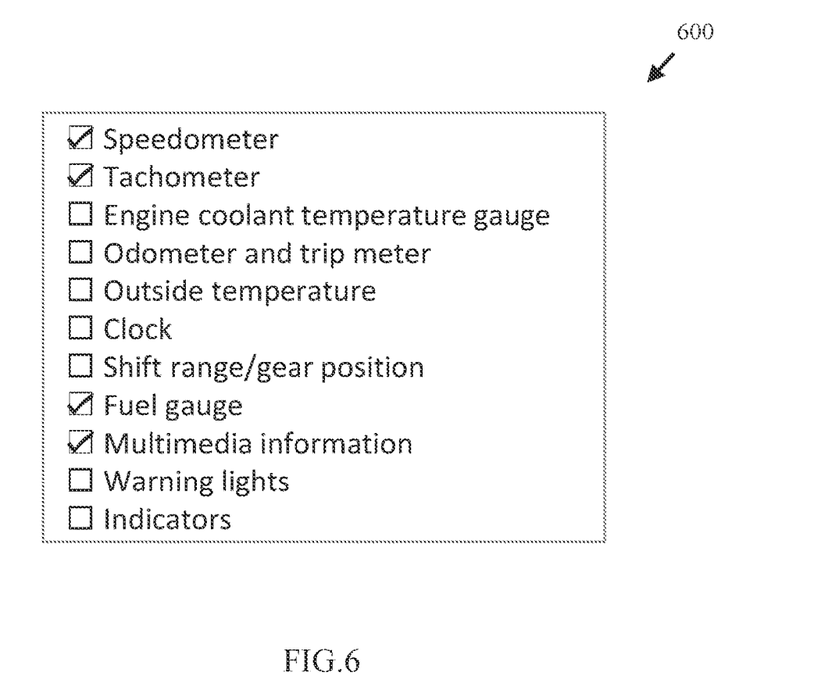
FIG. 6 is a diagram of a driving information selection interface according to an embodiment.

FIG. 6 is a diagram of a driving information selection interface 600 according to an embodiment. The selection interface 600 may be displayed on the passenger terminal for the user of the passenger terminal to select the driving information the user wishes to receive (or subscribe to) and then transmit the selection to the server device. The selection interface 600, in the example illustrated, may include a list of sensors or gauges that produce driving information. Alternatively, the list may include a list of driving information (i.e., "speed" instead of "speedometer"). The information selectable via the selection interface 600 is that information that the user of the passenger terminal has access rights to based on the role to which the user has been registered.

In the above-described embodiments, driving information is described as a type of information for which permissions may be set on a role basis. It is understood that this is just an example, and the driving information may be combined with other types of information (e.g., the navigator information or the multimedia data) or may be sub-divided into different types of driving information (e.g., environment information, vehicle information, etc.). Further, while the above-described embodiments exemplify driving information as information for which the other user can make selections or subscriptions to, it is understood that this is merely an example, and the same process of selecting specific information to subscribe to or receive is also applicable to other types of information (e.g., the navigator information and/or the multimedia data). For example, where a role registered for another user grants access to navigator information, the other user may select specific types of navigator information to receive (such as turn-by-turn guidance information, destination setting information, destination arrival information, etc.). Similarly, where a role registered for another user grants access to multimedia data, the other user may select specific types of multimedia data to receive (such as title information, artist information, audio source information, volume information, etc.).

Figure 7:
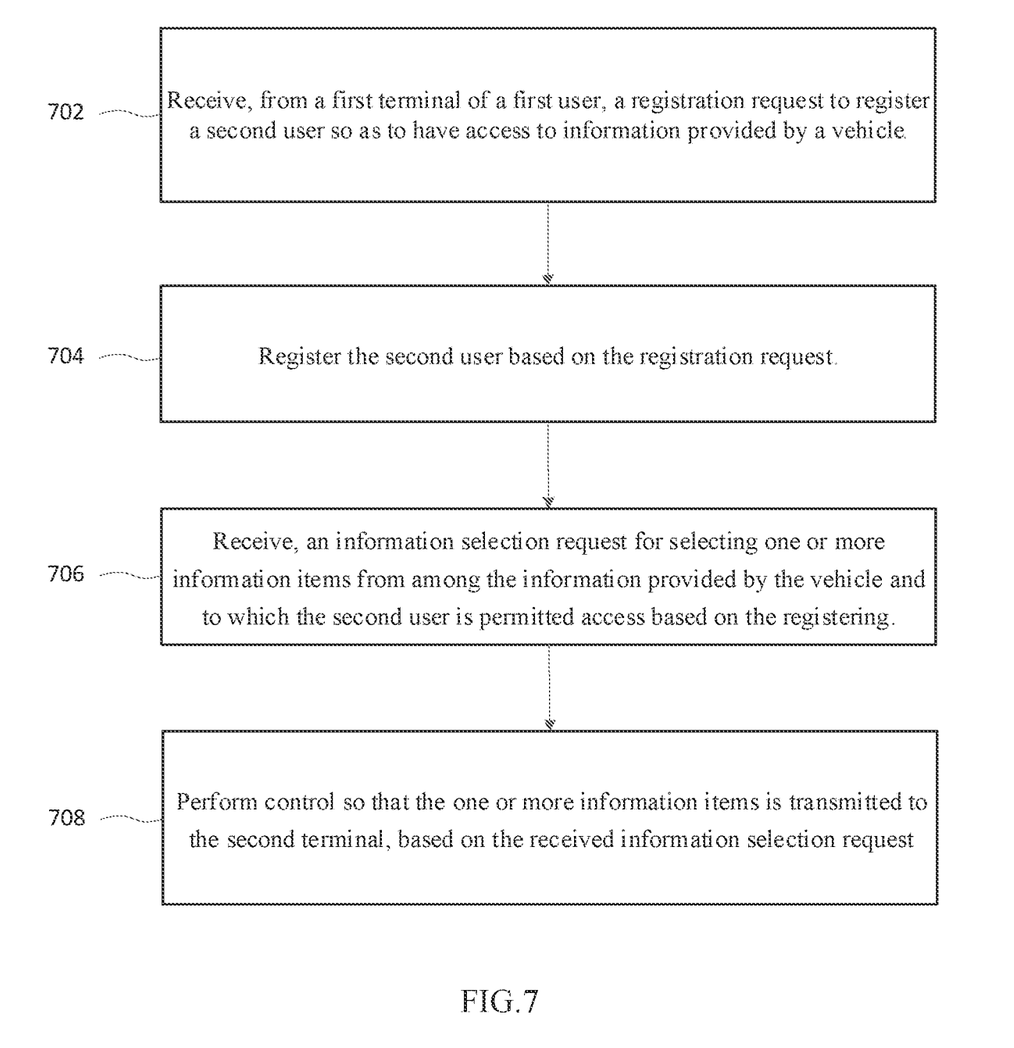
FIG. 7 is a flowchart for a method of providing driving information to non-driver users according to an embodiment.

FIG. 7 is a flowchart for a method of providing driving information to non-driver users according to an embodiment. Referring to FIG. 7, in operation 702, the system receives, from a first terminal of a first user, a registration request to register a second user so as to have access to information provided by a vehicle. In operation 704, the system the second user (or a terminal used by a second user) based on the registration request. In operation 706, the system receives, an information selection request for selecting one or more information items from among the information provided by the vehicle and to which the second user is permitted access based on the registering. In operation 708, the system performs control so that the one or more information items is transmitted to the second terminal, based on the received information selection request. Alternatively, in operation 708, the system transmits to a vehicle a notification of the information selected to be transmitted to the passenger terminal.

It is understood that one or more operations of the above-described methods may be omitted or combined with other operations, and one or more additional operations may be added.

According to embodiments, permissions and/or access rights to information provided by or relating to a vehicle is based on a role assigned or registered for a user. Therefore, the amount and type of information transmitted to a user can be limited or controlled based on the type of the user (e.g., a driver versus a passenger, a front seat passenger versus a backseat passenger, etc.). User convenience in terms of accessing only that information relevant to the user is therefore increased, as well as a reduction in data transmission overhead by limiting or reducing the amount of information that is accessible. In addition, by varying the permissions and/or access rights on a per user (or per user type) basis, a vehicle owner can control which information to share with other users and can prevent information that the user does not want to share from being accessed by other users.

Further, according to embodiments, information relating to the vehicle and to be provided to a registered user can be selected (or subscribed to) by the registered user. As a result, user convenience is improved by allowing a registered user to control the information provided to him/her, and a data transmission overhead is reduced.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. A method of a server device, comprising:
receiving, by the server device from a first terminal of a first user, a registration request to register a second user so as to have access to information provided by a vehicle;
registering, by the server device, the second user based on the registration request;
transmitting, from the server device to a second terminal of the second user, a notification indicating the second user is registered and an information selection interface including a plurality of information items, the information selection interface displayed on the second terminal;
receiving, by the server device from the second terminal of the second user, an information selection request that indicates selection of one or more information items from the plurality of information items included information selection interface;

transmitting, by the server device to the vehicle after reception of the information selection request, a first message to the vehicle that causes the vehicle to transmit, to the second terminal, a second message including the selected one or more information items which the second user is permitted to access based on the registering; and performing, by the server device based on the received information selection request, control so that the one or more information items is transmitted from the server device to the second terminal.

2. The method of claim 1, wherein:

the registration request includes a role, from among a plurality of selectable roles, to be set for the second user; and each of the plurality of selectable roles includes a different set of information for which access is permitted.

3. The method of claim 1, wherein the plurality of information items is transmitted to the second terminal at a preset time interval.

4. The method of claim 3, wherein the preset time interval is provided in the information selection request.

5. The method of claim 1, wherein the one or more information items is transmitted to the second terminal based on a trigger event.

6. The method of claim 1, wherein the information selection request includes a selection of driving information from among a list of available driving information obtained via sensors of the vehicle, and wherein the driving information specifies a condition of the vehicle.

7. A server device, comprising:

a memory storing instructions; and a processor configured to execute the instructions to:
  receive, from a first terminal of a first user, a registration request to register a second user so as to have access to information provided by a vehicle;
  register the second user based on the registration request;
  transmit, to a second terminal of the second user, a notification indicating the second user is registered and an information selection interface including a plurality of information items, the information selection interface displayed on the second terminal;
  receive, from the second terminal of the second user, an information selection request that indicates selection of one or more information items from the plurality of information items included information selection interface;
  transmit, by server device to the vehicle after reception of the information selection request, a first message to the vehicle that causes the vehicle to transmit, to the second terminal, a second message including the selected one or more information items which the second user is permitted to access based on the registering; and
  perform, based on the received information selection request, control so that the one or more information items is transmitted from the server device to the second terminal.

8. The server device of claim 7, wherein:

the registration request includes a role, from among a plurality of selectable roles, to be set for the second user, and each of the plurality of selectable roles includes a different set of information for which access is permitted.

9. The server device of claim 7, wherein the plurality of information items is transmitted to the second terminal at a preset time interval.

10. The server device of claim 9, wherein the preset time interval is provided in the information selection request.

11. The server device of claim 7, wherein the one or more information items is transmitted to the second terminal based on a trigger event.

12. The server device of claim 7, wherein the information selection request includes a selection of driving information from among a list of available driving information provided by sensors of a vehicle, and wherein the driving information specifies a condition of the vehicle.

13. A non-transitory computer-readable medium storing instructions, the instructions comprising: one or more instructions that, when executed by one or more processors of a server device, cause the one or more processors to:
  receive, by the server device from a first terminal of a first user, a registration request to register a second user so as to have access to information provided by a vehicle;
  register the second user based on the registration request;
  transmit, from the server device to a second terminal of the second user, a notification indicating the second user is registered and an information selection interface including a plurality of information items, the information selection interface displayed on the second terminal;
  receive, by the server device from the second terminal of the second user, an information selection request that indicates selection of one or more information items from the plurality of information items included information selection interface;
  transmit, by the server device to the vehicle after reception of the information selection request, a first message to the vehicle that causes the vehicle to transmit, to the second terminal, a second message including the selected one or more information items which the second user is permitted to access based on the registering; and
  perform, by the server device based on the received information selection request, control so that the one or more information items is transmitted to the second terminal.

14. The non-transitory computer-readable medium of claim 13, wherein:

the registration request includes a role, from among a plurality of selectable roles, to be set for the second user, and each of the plurality of selectable roles includes a different set of information for which access is permitted.

15. The non-transitory computer-readable medium of claim 13, wherein the plurality of information items is transmitted to the second terminal at a preset time interval.

16. The non-transitory computer-readable medium of claim 15, wherein the preset time interval is provided in the information selection request.

17. The non-transitory computer-readable medium of claim 13, wherein the one or more information items is transmitted to the second terminal based on a trigger event.

* * * * *